(12) United States Patent
Kuras (10) Patent No.: US 6,409,628 B1
(45) Date of Patent: Jun. 25, 2002

(54) METHOD AND APPARATUS FOR PREVENTING HUNTING BETWEEN RANGES IN A CONTINUOUSLY VARIABLE TRANSMISSION

(75) Inventor: Brian D. Kuras, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/676,411

(22) Filed: Sep. 29, 2000

(51) Int. Cl.⁷ ............................................. B60K 41/16
(52) U.S. Cl. ......................................... 477/69; 477/41
(58) Field of Search ............................. 477/52, 68, 69, 477/41, 43

(56) References Cited

U.S. PATENT DOCUMENTS

| | | | |
|---|---|---|---|
| 4,170,153 A | * | 10/1979 | Mizuno et al. |
| 4,254,672 A | * | 3/1981 | Mizuno et al. |
| 4,368,798 A | | 1/1983 | Meyerle et al. |
| 4,464,952 A | | 8/1984 | Stubbs |
| 4,682,518 A | * | 7/1987 | Takada et al. |
| 4,844,221 A | | 7/1989 | Sakai et al. |
| 4,852,429 A | | 8/1989 | Kunzer et al. |
| 5,024,306 A | | 6/1991 | Fukui et al. |
| 5,157,609 A | | 10/1992 | Steble et al. |
| 5,168,449 A | | 12/1992 | Benford |
| 5,988,335 A | | 11/1999 | Kupferschmid et al. |
| 5,996,343 A | | 12/1999 | Kuras |
| 6,001,038 A | | 12/1999 | Wontner et al. |
| 6,106,427 A | * | 8/2000 | Nikolaus et al. ............... 475/76 |
| 6,295,497 B1 | * | 9/2001 | Kuras ........................... 701/51 |

* cited by examiner

Primary Examiner—Sherry Estremsky
Assistant Examiner—Eric M. Williams
(74) Attorney, Agent, or Firm—John W. Morrison (57) ABSTRACT

A transmission assembly is disclosed. The transmission assembly includes a continuously variable transmission driven by an input shaft at an input speed, a mechanical transmission coupled to the continuously variable transmission for selecting a first gear range and a second gear range, an output shaft driven by the mechanical transmission at an output speed, and controller operable to receive a speed command and generate a transmission ratio is command which control a ratio of the output speed to the input speed, and generate a shift command which causes the mechanical transmission to shift from the first gear range to the second gear range. An upper transmission ratio limit defined by an engine lug limit. A lower transmission ratio limit is defined by an engine overspeed limit. The controller causes the transmission to execute a shift from the first gear range to the second gear range which causes an instantaneous change in output speed. The engine lug limit or the engine overspeed limit are adjusted to inhibit a subsequent shift from the second gear range to the first gear range. A method for controlling a transmission assembly is also disclosed.

22 Claims, 5 Drawing Sheets

METHOD AND APPARATUS FOR PREVENTING HUNTING BETWEEN RANGES IN A CONTINUOUSLY VARIABLE TRANSMISSION

TECHNICAL FIELD

The present invention generally relates to a continuously variable transmission, and more specifically to a method and apparatus for preventing hunting between ranges in a continuously variable transmission.

BACKGROUND ART

Many work machines, particularly earth working machines, use a continuously variable transmission to drive traction wheels or tracks which propel the work machine. Typically, a hydrostatic transmission, consisting of a variable speed hydraulic pump and a hydraulic motor, provides a continuously variable speed output to the wheels or tracks of the work machine. In particular, the speed output can be continuously varied by controlling the displacement of the hydraulic pump.

Conventional transmissions operate over a distinct number of gear ratios. Shifts between adjacent gear ratios generally keeps an engine, which drives the transmission, within its desired operating range. A drawback to a continuously variable transmission is that transmission ratios, or the ratio of transmission output speed to engine speed, can be commanded which are outside of the desired operating range of the engine which drives the transmission. If a transmission ratio is too large, then the engine may run below its desired operating point or lug limit. Therefore, it is desirable to place an upper limit on the transmission ratio command based on a lug limit of the engine to prevent possible engine stalls. Similarly, it is desirable to place a lower limit on the transmission ratio command based on an overspeed limit of the engine to prevent possible engine from running too fast.

However, during an upshift from one gear range to another, it is common that the output speed of the transmission may drop due to a slow shift or shifting away from the optimum shift point. During an upshift, if the actual output speed drops, the commanded transmission ratio can drop because the commanded ratio is limited by the output speed (which could decrease, thus decreasing the limited ratio command). Thus, the limited ratio command may cause the transmission to execute a downshift soon after an upshift due to the decrease in ratio command. During a downshift, the output speed of the transmission may increase due to shifting away from the optimum shift point. If the actual output speed increases, the commanded transmission ratio can increase because the commanded ratio is limited by the output speed (which could increase, thus increasing the limited ratio command). Thus, the limited ratio command may cause the transmission to execute a upshift soon after an downshift due to the increase in ratio command. Any series of shifting, or hunting, between one gear and another is undesirable as each shift causes a torque interruption which can decrease the perceived performance of the work machine.

What is needed therefore is a method and apparatus for preventing hunting between ranges in a continuously variable transmission which overcomes the above-mentioned drawbacks.

DISCLOSURE OF THE INVENTION

In accordance with a first aspect of the present invention, there is provided an transmission assembly. The transmission assembly includes a continuously variable transmission driven by an input shaft at an input speed, a mechanical transmission coupled to the continuously variable transmission for selecting a first gear range and a second gear range, an output shaft driven by the mechanical transmission at an output speed, and controller operable to receive a speed command and generate a transmission ratio command which control a ratio of the output speed to the input speed, and generate a shift command which causes the mechanical transmission to shift from the first gear range to the second gear range. An upper transmission ratio limit defined by an engine lug limit. A lower transmission ratio limit is defined by an engine overspeed limit. The controller causes the transmission to execute a shift from the first gear range to the second gear range which causes an instantaneous change in output speed. The engine lug limit or the engine overspeed limit are adjusted to inhibit a subsequent shift from the second gear range to the first gear range.

In accordance with a second aspect of the present invention, there is provided a method for controlling a transmission assembly. The transmission assembly has a continuously variable transmission driven by an input shaft at an input speed, a mechanical transmission coupled to the continuously variable transmission for selecting a first gear range and a second gear range, an output shaft driven by the mechanical transmission at an output speed, and a controller. The controller is operable to receive a speed command and generate a transmission ratio command which control a ratio of the output speed to the input speed and generate a shift command which causes the mechanical transmission to shift from the first gear range to the second gear range. The method includes the steps of defining an upper transmission ratio limit with an engine lug limit and defining a lower transmission ratio limit with an engine overspeed limit. The method further includes the steps of executing a shift from the first gear range to the second gear range which causes an instantaneous change in output speed and adjusting the engine lug limit or the engine overspeed limit to inhibit a subsequent shift from the second gear range to the first gear range.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
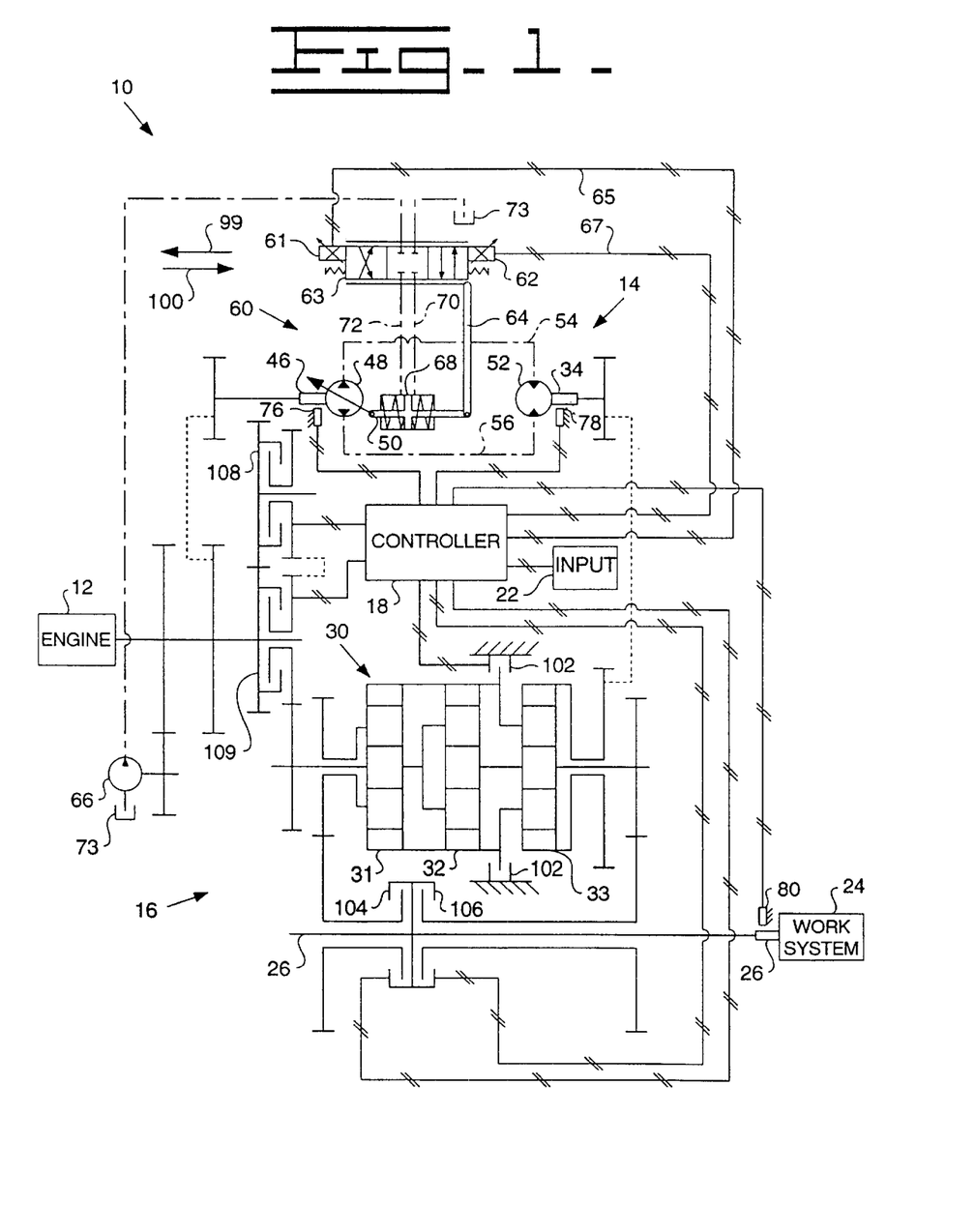
FIG. 1 is a schematic view of a hydro-mechanical, continuously variable transmission which incorporates the features of the present invention therein.

Referring now to FIG. 1, there is shown a transmission assembly 10 that incorporates the features of the present invention therein. The transmission assembly 10 is adapted for use in a work machine, such as a loader (not shown), having an engine 12. The transmission assembly 10 is of the continuously variable type which includes a continuously variable hydrostatic transmission 14, a mechanical transmission 16, a micro-processor based controller 18, and a command input arrangement 22. A work system 24 is connected to the transmission assembly 10 via a drive shaft 26. The work system 24 is typically the drive wheels or tracks of the work machine.

The hydrostatic transmission 14 is operatively connected to the engine 12 through a pump input drive shaft 46. The hydrostatic transmission 14 includes a variable displacement pump 48 and a motor 52 operatively connected to the variable displacement pump 48 by conduits 54 and 56 to form a hydraulic circuit. A displacement controller 50 sets the displacement of the variable displacement pump 48 and thus controls the flow of hydraulic fluid between the variable displacement pump 48 and the motor 52. Varying the flow varies the speed of the motor output shaft 34 of the motor 52.

The mechanical transmission 16 includes a summing planetary gear arrangement 30, having a first planetary gear set 31, a second planetary gear set 32, and a third planetary gear set 33 which selectively combines the output from the continuously variable hydrostatic transmission 14 with the output of the engine 12 to drive the output shaft 26. To select a first gear range, a clutch 102 and a clutch 104 are engaged. To select a second forward gear range, a clutch 108 and the clutch 104 are engaged. To select a third forward gear range, the clutch 108 and a clutch 106 are engaged. To select a second reverse gear range, a clutch 109 and the clutch 104 are engaged. To select a third reverse gear range, the clutch 109 and a clutch 106 are engaged.

The transmission 10 further includes a transmission input speed sensor 76 operative to sense the speed of the pump input shaft 46 and direct a transmission input speed signal representative of the transmission input speed or engine speed to the controller 18. The transmission 10 yet further includes a motor speed sensor 78 operative to sense the speed of the motor output shaft 34 and direct a motor speed signal representative of the motor output speed to the controller 18. The motor speed signal combined with the transmission input speed signal can also be used to determine a transmission output speed and a machine travel speed if the engagement state of the clutches 102, 104, 106, 108, and 109 are known.

The transmission 10 further includes a transmission output speed sensor 80 is operative to sense the transmission output speed and direct a transmission output speed signal to the controller 18. Either of the motor speed sensor 78 combined with the input speed sensor 76 or the transmission output speed sensor 80 can be used to calculate the transmission output speed or the machine travel speed. However, in the present invention, the motor speed sensor 78 is used to precisely control the displacement of the pump 48 and therefore has a much higher resolution and lower dropout than the transmission output speed sensor 80. Thus, it is preferable to use the motor speed sensor 78 and the engagement state of the clutches 102, 104, 106, 108, and 109 to determine the transmission output speed and the machine travel speed. However, it is still possible and practical to use the output speed sensor 80 to determine machine travel speed.

The command input arrangement 22 receives operator inputs and transmits desired velocity and directional signals to the controller 18. The controller 18 includes RAM and ROM (not shown) that store transmission control software. The controller 18 reads the desired velocity, reads the directional signals, reads the speed sensors 76,78,80, and transmits clutch control signals to control the engagement of the clutches 102, 104, 106, 108, 109 to engage the appropriate gear range as described above.

In addition, the controller 18 generates the transmission ratio commands which control the displacement of the pump 48, and thus, the speed of the output shaft 34 of the motor 52.

Figure 2:
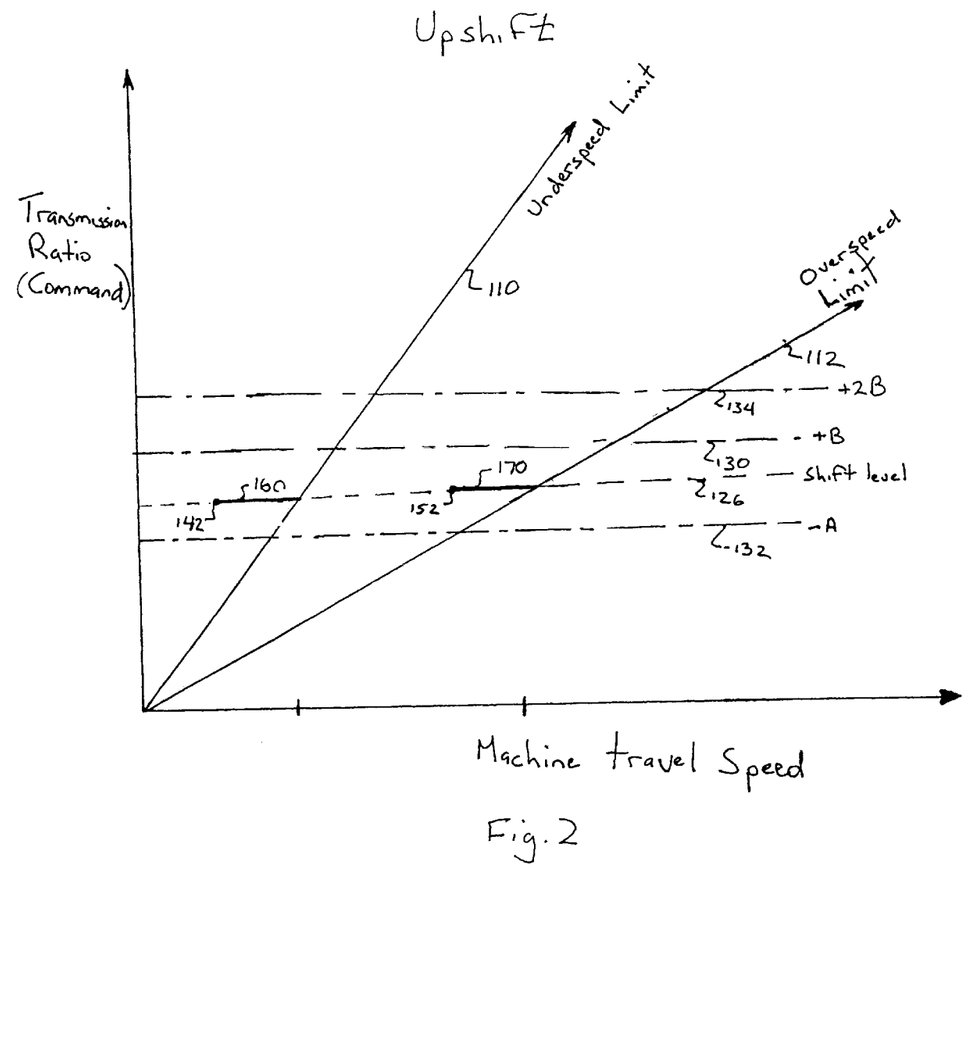
FIG. 2 is a graph of a modified transmission ratio limiting algorithm during an upshift.
Figure 3:
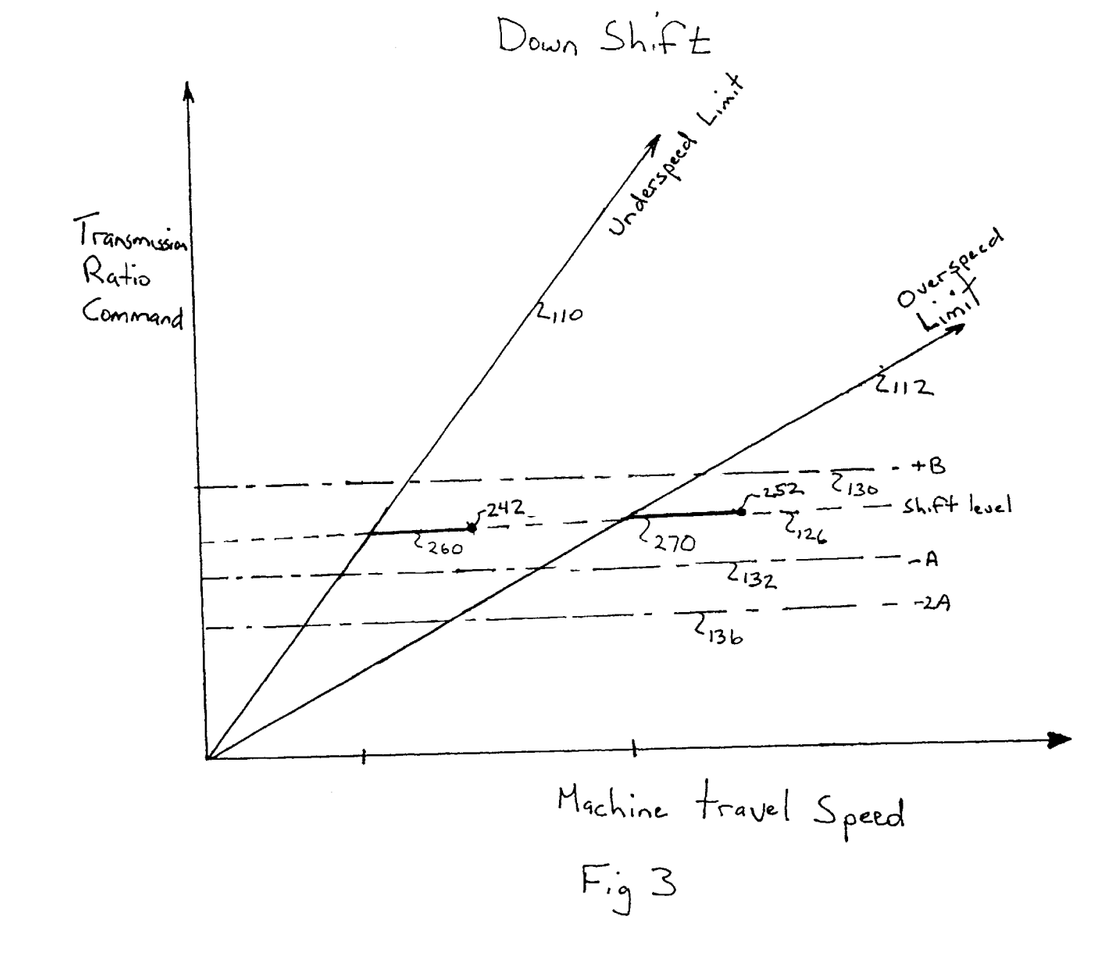
FIG. 3 is a graph of a modified transmission ratio limiting algorithm during a downshift.

Referring now to FIGS. 2 and 3, there is shown a pair of graphs which illustrate a limiting algorithm which places an upper ratio limit 110 and a lower transmission ratio limit 112 on the transmission ratio command. The upper transmission ratio limit 110 is based on a optimal lug limit of the engine 12. In particular, the upper transmission ratio limit 110 is the ratio of the machine travel speed to an engine lug limit. The engine lug limit is an actual engine speed below which it is undesirable to operate the engine 12 due to the likelihood that if the engine 12 were to drop too far below the lug limit, the engine 12 will stall. In addition, the engine lug limit is set to cause the engine to operate at an optimal peak power point. It should be appreciated that the engine 12 in the present invention is set at a constant governor speed and the speed of the output shaft 26 is controlled by the continuously variable transmission ratio.

On the other hand, the lower transmission ratio limit 112 is the ratio of the machine travel speed to an engine overspeed limit. The engine overspeed limit is an actual engine speed above which it is undesirable to operate the engine 12 due to the likelihood that the engine and/or drivetrain components will have a reduced useful life. It should be appreciated that both the engine lug limit and the engine overspeed limit are specific to a particular engine 12 and transmission 10.

The limiting algorithm modifies the transmission ratio commands to keep transmission ratio commands between the upper transmission ratio limit 110 and the lower transmission ratio limit 112 based on machine travel speed. For example, if the machine travel speed is at a speed which would cause the engine to operate below the engine lug limit at the current transmission ratio command, the transmission ratio command is modified such the transmission operates along the upper ratio limit 110. Similarly, if the machine travel speed is at a speed which would cause the engine to operate above the engine overspeed limit at the current transmission ratio command, the transmission ratio command is modified such the transmission operates along the lower ratio limit 112.

Figure 4:
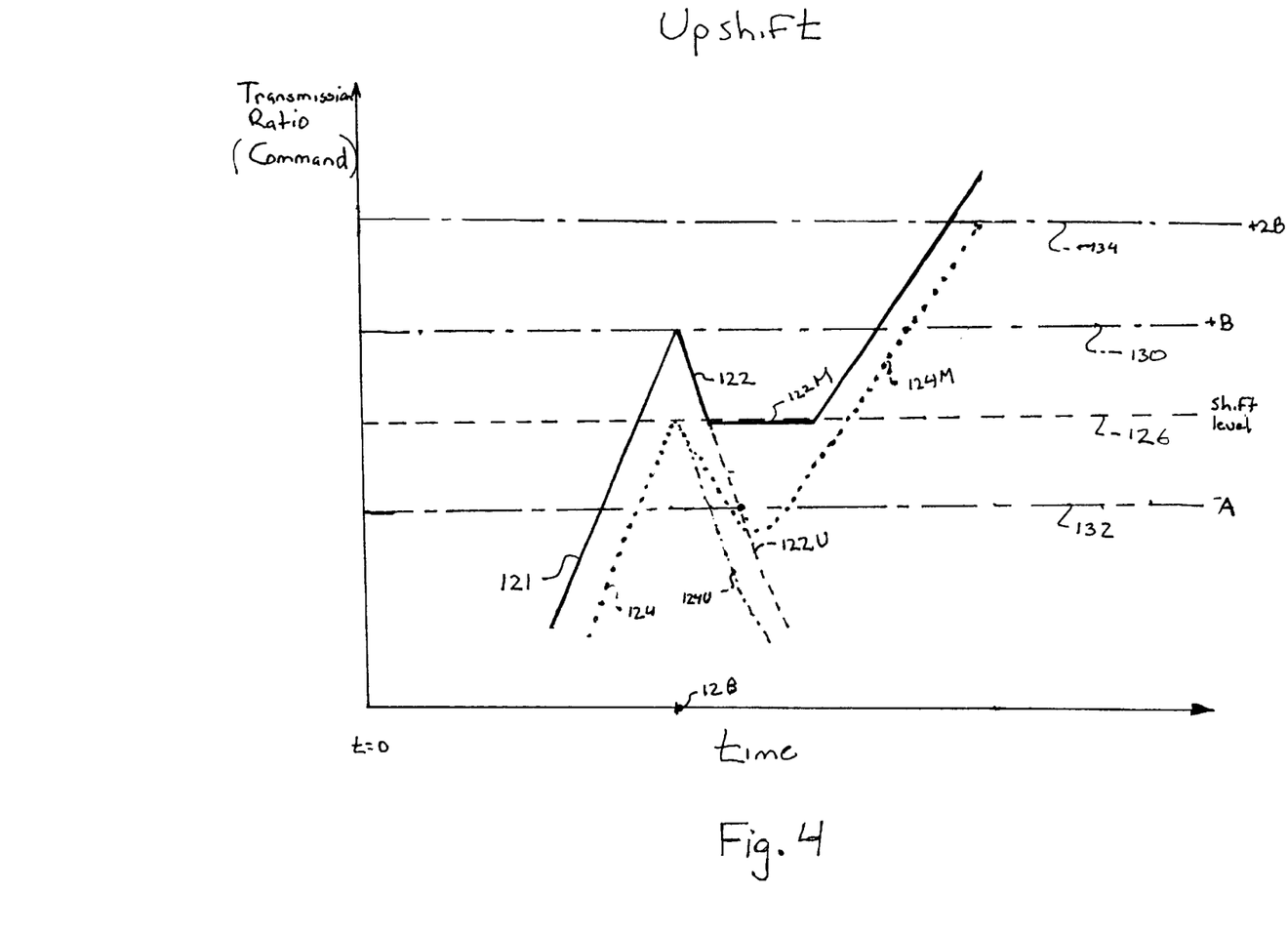
FIG. 4 is a graph of the results of the modified ratio limiting algorithm which shows how hunting can be prevented after an upshift.

Referring now to FIG. 4, there is shown the results of using the limiting algorithm of FIG. 2 during an upshift from a first gear range having a relatively low transmission ratio and following the command 121 to a second gear range having a relatively high transmission ratio following the command 122.

The limiting algorithm is based on the assumption that changes in output speed of the transmission 10 are caused by changes in the speed of the engine 12. However, during an upshift, the travel speed can drop due to a shift which occurs at a sub-optimal shift point or a slow shift caused by not disengaging and engaging the appropriate clutch at the correct time. As an actual transmission ratio 124 reaches the shift level 126, the controller 18 executes a shift from the first gear range to the second gear range at a time 128.

The transmission control software in the controller 18 also contains an upshift anti-hunt logic which is designed to prevent downshifts immediately after an upshift. Each shift, both upshifts and downshifts, cause an interruption of power through the transmission 10 which can undesirably reduce the performance of the transmission 10. After the upshift at the time 128, the controller 18 will inhibit a downshift from the second gear range to the first gear range unless (i) the transmission ratio command 122 in the second gear range falls below the shift level 126 by a first value, A, at a level 132, or (ii) the actual transmission ratio 124 exceeds the shift level 126 by a second value, B, at a level 130

Because the upshift may cause a drop in the output speed of the transmission 10 and the limit of the command 122 is based on the output speed, the command may follow the unmodified command path 122U. This causes the limited transmission ratio command to follow the path 122U (which is a function of actual machine travel speed or actual ratio 124U) and rapidly reaches the level 132 at a point 134 which will cause the controller 18 to initiate a downshift soon after the upshift. The output speed is falling not because the engine is lugging, but because of the upshift from the first gear range to the second gear range. To prevent this downshift, the controller 18 commands the transmission ratio to follow the modified path 122M which prevents the command from falling below the shift level 126 by the first value, A, at the level 132, after the upshift.

Referring now to FIG. 2, by holding the modified command 122M at the shift level 126, the controller 18 is effectively modifying either the upper transmission ratio limit 110, or the lower transmission ratio limit 112. The controller 18 determines if the ratio command falls between the upper limit 110 and the lower limit 112 at the measured output speed. For example, when operating along the upper transmission ratio limit 110 during an upshift, the machine travel speed can drop, and the modified command 122M of FIG. 4 will cause the transmission ratio command to operate along the line 160. As the output speed accelerates or decelerates, the underspeed lug limit is adjusted as a function of the output speed to force the upper limit (which then may limit ratio command) to stay at the level 122M to prevent the command from falling below the level 132 and thus preventing an unwanted downshift. The lug limit is continually adjusted to force the upper limit to follow the line 160 of FIG. 2.

However, the lug limit can only be decreased to a minimum lug limit which occurs at a point 142. If the modified lug limit is less than the lug limit associated with point 142, then the drop in output speed is most likely caused by a real increase in load and is not the solely the result of a poor upshift. At this time, the controller 18 commands the transmission 10 to operate along the upper transmission ratio limit 110, which will cause the command to immediately fall below the level 132 and the controller 18 will execute a downshift from the second gear range to the first gear range.

Similarly, when operating along the lower transmission ratio limit 112 during an upshift, the machine travel speed can drop, and the modified command 122M of FIG. 4 will cause the transmission ratio command to operate along a line 170. As the output speed accelerates or decelerates, the overspeed limit is adjusted as a function of the output speed to force the lower limit (which then may limit ratio command) to stay at the level 122M to prevent the command from falling below the level 132 and thus preventing an unwanted downshift. The overspeed limit is continually adjusted to force the lower limit to follow the line 170 of FIG. 2.

However, the overspeed limit can only be decreased to a minimum overspeed limit which occurs at a point 152. If the modified overspeed limit is less than the overspeed limit associated with the point 152, then the drop in output speed is most likely caused by a real increase in load and is not the solely the result of a poor upshift. At this time the controller 18 commands the transmission to operate along the lower transmission ratio limit 112, which will cause the command to likely fall below the level 132 and the controller 18 will execute a downshift from the second gear range to the first gear range.

It should be appreciated that the modified command 122M allows the transmission to operate along the path 124M until the transmission ratio reaches the level 134, at which point the engine lug limit and engine overspeed limit are no longer modified. The modified ratio command follows the path 122M unless the underspeed limit falls below a minimum underspeed limit at the point 142 or the overspeed limit falls below the minimum overspeed limit at the point 152.

Figure 5:
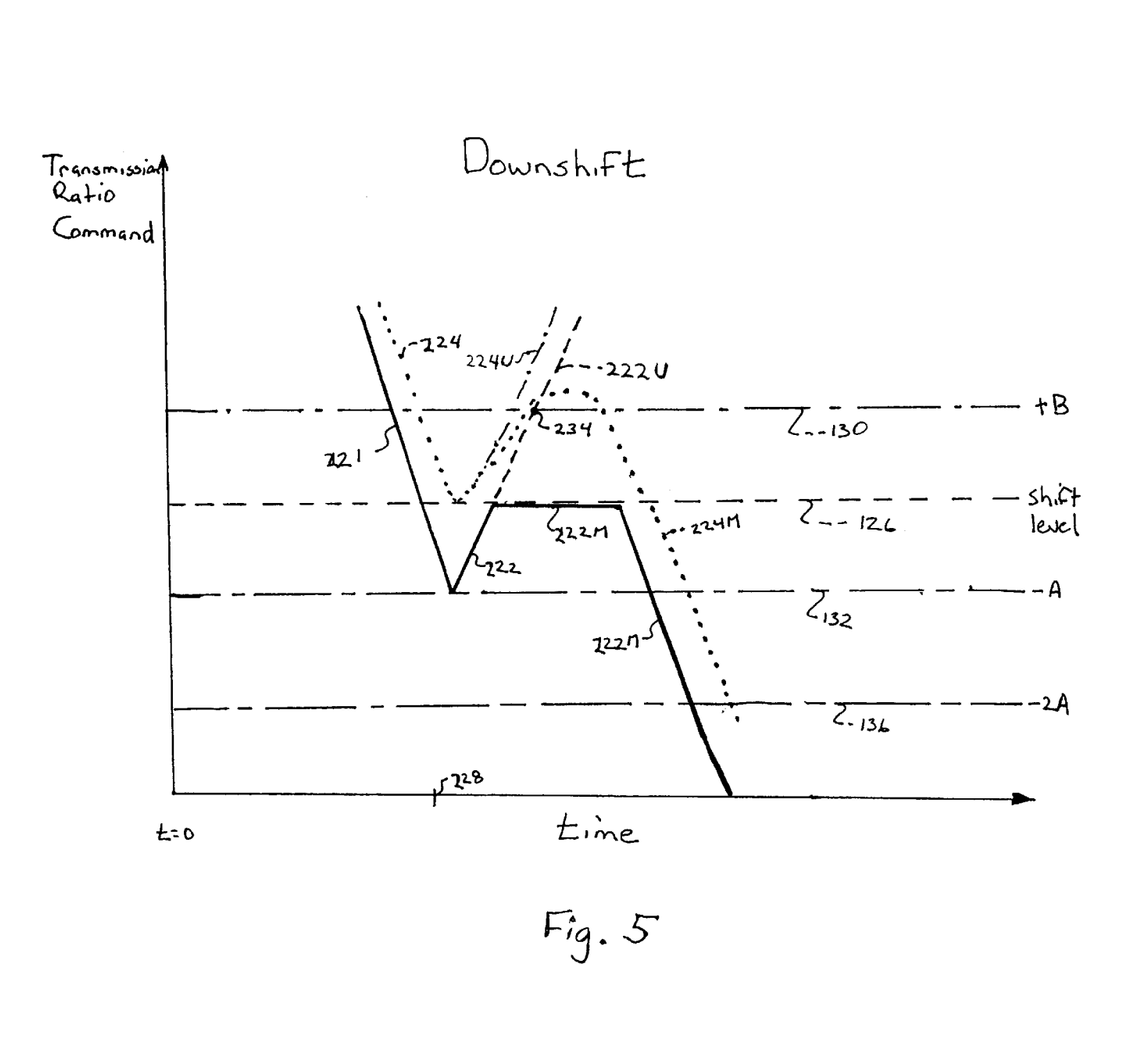
FIG. 5 is a graph of the results of the modified ratio limiting algorithm which shows how hunting can be prevented after a downshift.

Referring now to FIG. 5, there is shown the results of using the limiting algorithm of FIG. 3 during an downshift from a first gear range following having a relatively high transmission ratio and following the command 221 to a second gear range having a relatively low transmission ratio following the command 222. During a downshift, the travel speed can increase due to a shift which occurs at a suboptimal shift point. As an actual transmission ratio 224 reaches the shift level 126, the controller 18 executes a shift from the first gear range to the second gear range at a time 228.

The transmission control software in the controller 18 also contains a downshift anti-hunt logic. After the downshift at the time 228, the controller 18 will inhibit an upshift from the second gear range to the first gear range unless (i) the transmission ratio command 222 in the second gear range exceeds the shift level 126 by a second value, B, at the level 130, or (ii) the actual transmission ratio 224 falls below the shift level 126 by the first value, A, at the level 132.

Because the downshift may cause an increase in the output speed of the transmission 10 and the limit of the command 222 is based on the output speed, the command may follow the path of the unmodified command 222U. This causes the limited transmission ratio command to follow the path 222U (which is a function of the actual machine travel speed or ratio 224U) and rapidly reaches the level 130 at a point 234 which will cause the controller 18 to initiate an upshift soon after the downshift. To prevent this upshift, the controller 18 commands the transmission ratio to follow the modified path 222M which prevents the command from exceeding the shift level 126 by a second value, B, at the level 130, after the downshift.

Referring now to FIG. 3, by holding the modified command 222M at the shift level 126, the controller 18 is effectively modifying either the upper transmission ratio limit 110, or the lower transmission ratio limit 112. For example, when operating along the upper transmission ratio limit 110 during an downshift, the machine travel speed can increase and the modified command 222M of FIG. 5 will cause the transmission ratio commmand to operate along a line 260. As the output speed accelerates or decelerates, the underspeed lug limit is adjusted as a function of the output speed to force the upper limit (which then may limit ratio command) to stay at the level 222M to prevent the command from exceeding the level 130 and thus preventing an unwanted upshift. The lug limit is continually adjusted to force the upper limit to follow the line 260 of FIG. 3.

However, the lug limit can only be increased to a maximum lug limit which occurs at a point 242. If the modified lug limit is greater than the lug limit associated with the point 242, then the increase in output speed is most likely caused by a real decrease in load and is not the solely the result of a poor downshift. At this time, the controller 18 commands the transmission to operate along the upper transmission ratio limit 110, which will cause the command to immediately exceed the level 130 and the controller will execute an upshift from the second gear range to the first gear range.

Similarly, when operating along the lower transmission ratio limit 112 during a downshift, the machine travel speed can increase, and the modified command 222M of FIG. 5 will cause the transmission ratio command to operate along a line 270. As the output speed accelerates or decelerates, the overspeed limit is adjusted as a function of the output speed to force the lower limit (which then may limit ratio command) to stay at the level 222M to prevent the command from exceeding the level 130 and thus preventing an unwanted upshift. The overspeed limit is continually adjusted to force the lower limit to follow the line 270 of FIG. 3.

However, the overspeed limit can only be increased to a maximum overspeed limit which occurs at a point 252. If the modified overspeed limit is greater than the overspeed limit associated with the point 252, then the increase in output speed is most likely caused by a real decrease in load and is not solely the result of a poor downshift. At this time, the controller 18 commands the transmission to operate along the lower transmission ratio limit 112, which will cause the command to immediately exceed the level 130 and the controller 18 will execute an upshift from the second gear range to the first gear range.

It should be appreciated that the modified command 222M allows the transmission 10 to operate along the path 224M until the transmission ratio reaches the level 136, at which point the engine lug limit and the engine overspeed limit are no longer modified. The transmission 10 follows the path 224M unless the underspeed limit exceeds a maximum underspeed limit at the point 242 or the overspeed limit exceeds the maximum overspeed limit at the point 252.

Industrial Applicability

In operation, a limiting algorithm modifies the transmission ratio commands to keep transmission ratio commands between the upper transmission ratio limit 110, based on an engine lug limit, and the lower transmission ratio limit 112, based on an engine overspeed limit.

During an upshift, the output speed of the transmission 10 may drop causing a corresponding drop in the limited ratio command. This may cause the controller 18 to initiate an immediate downshift if the ratio command falls below the level 132. To prevent this downshift, the controller 18 holds the transmission ratio command at the shift level 126 is after the upshift. In effect, this decreases the lug limit used to define the upper limit 110 and decreases the overspeed limit used to define the lower limit 112. The lug limit and overspeed limit are decreased until the actual ratio 122 exceeds a value 134 or the lug limit or overspeed limit falls below their respective minimum values associated with the points 142, 152.

During a downshift, the output speed of the transmission 10 may increase causing a corresponding increase in the limited ratio command. This may cause the controller 18 to initiate an immediate upshift if the ratio command exceeds the level 130. To prevent this upshift, the controller 18 holds the transmission ratio command at the shift level 126 after the upshift. In effect, this increases the lug limit used to define the upper limit 110 and increases the overspeed limit used to define the lower limit 112. The lug limit and overspeed limit are increased until the actual ratio 122 falls below the value 136 or the lug limit or overspeed limit exceed their respective maximum value associated with the points 242, 252.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

Other aspects, objects and advantages of this invention can be obtained from a study of the drawings, the disclosure and the appended claims.

What is claimed is:

1. A transmission assembly, comprising:
  a continuously variable transmission driven by an input shaft at an input speed;
  a mechanical transmission coupled to the continuously variable transmission for selecting a first gear range and a second gear range;
  an output shaft driven by the mechanical transmission at an output speed; and
  a controller operable to (i) receive a speed command and generate a transmission ratio command which control a ratio of the output speed to the input speed, and (ii) generate a shift command which causes the mechanical transmission to shift from the first gear range to the second gear range, wherein:
    an upper transmission ratio limit defined by an engine lug limit,
    a lower transmission ratio limit is defined by an engine overspeed limit,
    the controller causes the transmission to execute a shift from the first gear range to the second gear range which causes an instantaneous change in output speed, and
    the engine lug limit or the engine overspeed limit are adjusted to inhibit a subsequent shift from the second gear range to the first gear range.

2. The apparatus of claim 1, wherein the engine lug limit or engine overspeed limit are decreased during an upshift from a first gear range having a relatively low transmission ratio to a second gear range having a relatively high transmission ratio.

3. The apparatus of claim 2, wherein:
  the transmission ratio command is held at a fixed level, and
  the engine lug limit is adjusted to the ratio of the output speed to the fixed level.

4. The apparatus of claim 3, wherein the transmission ratio command is held at the fixed level until the lug limit falls below a minimum lug limit.

5. The apparatus of claim 3, wherein the fixed level is the transmission ratio command when the controller initiated a shift from the first gear range to the second gear range.

6. The apparatus of claim 3, wherein the engine lug limit is adjusted until the transmission ratio exceeds the transmission ratio when the controller initiated a shift from the first gear range to the second gear range by a first value.

7. The apparatus of claim 1, wherein the engine lug limit or engine overspeed limit are increased during a downshift from a first gear range having a relatively high transmission ratio to a second gear range having a relatively low transmission ratio.

8. The apparatus of claim 7, wherein:

the transmission ratio command is held at a fixed level, and the engine overspeed limit is adjusted to the ratio of the output speed to the fixed level.

9. The apparatus of claim 8, wherein the transmission ratio command is held at the fixed level until the engine overspeed limit exceeds a maximum engine overspeed limit.

10. The apparatus of claim 9, wherein the fixed level is the transmission ratio when the controller initiated a shift from the first gear range to the second gear range.

11. The apparatus of claim 9, wherein the engine lug limit is adjusted until the transmission ratio falls below the transmission ratio when the controller initiated a shift from the first gear range to the second gear range by a second value.

12. A method of controlling a transmission assembly having (i) a continuously variable transmission driven by an input shaft at an input speed, (ii) a mechanical transmission coupled to the continuously variable transmission for selecting a first gear range and a second gear range, (iii) an output shaft driven by the mechanical transmission at an output speed, and (iv) a controller operable to receive a speed command and generate a transmission ratio command which control a ratio of the output speed to the input speed, and generate a shift command which causes the mechanical transmission to shift from the first gear range to the second gear range, the method comprising the steps of:

defining an upper transmission ratio limit with an engine lug limit, defining a lower transmission ratio limit with an engine overspeed limit, executing a shift from the first gear range to the second gear range which causes an instantaneous change in output speed, and adjusting the engine lug limit or the engine overspeed limit to inhibit a subsequent shift from the second gear range to the first gear range.

13. The method of claim 12, further comprising the step of decreasing the engine lug limit or engine overspeed limit during an upshift from a first gear range having a relatively low transmission ratio to a second gear range having a relatively high transmission ratio.

14. The method of claim 13, further comprising the of:

holding the transmission ratio command at a fixed level; and adjusting the engine lug limit to the ratio of the output speed to the fixed level.

15. The method of claim 13, further comprising the step of holding the transmission ratio command is at the fixed level until the lug limit falls below a minimum lug limit.

16. The method of claim 15, further comprising the step of setting the fixed level to the transmission ratio command when the controller initiated a shift from the first gear range to the second gear range.

17. The method of claim 13, further comprising the step of adjusting the engine lug limit until the transmission ratio exceeds the transmission ratio when the controller initiated a shift from the first gear range to the second gear range by a first value.

18. The method of claim 12, further comprising the step of increasing the engine lug limit and engine overspeed limit during an upshift from a first gear range having a relatively high transmission ratio to a second gear range having a relatively low transmission ratio.

19. The method of claim 18, further comprising the of:

holding the transmission ratio command at a fixed level; and adjusting the engine overspeed limit to the ratio of the output speed to the fixed level.

20. The method of claim 18, further comprising the step of holding the transmission ratio command at the fixed level until the engine speed exceeds a maximum overspeed limit.

21. The method of claim 20, further comprising the step of setting the fixed level to the transmission ratio command when the controller initiated a shift from the first gear range to the second gear range.

22. The method of claim 21, further comprising the step of adjusting the engine overspeed limit until the transmission ratio falls below the transmission ratio when the controller initiated a shift from the first gear range to the second gear range by a first value.

* * * * *